Figure 1:
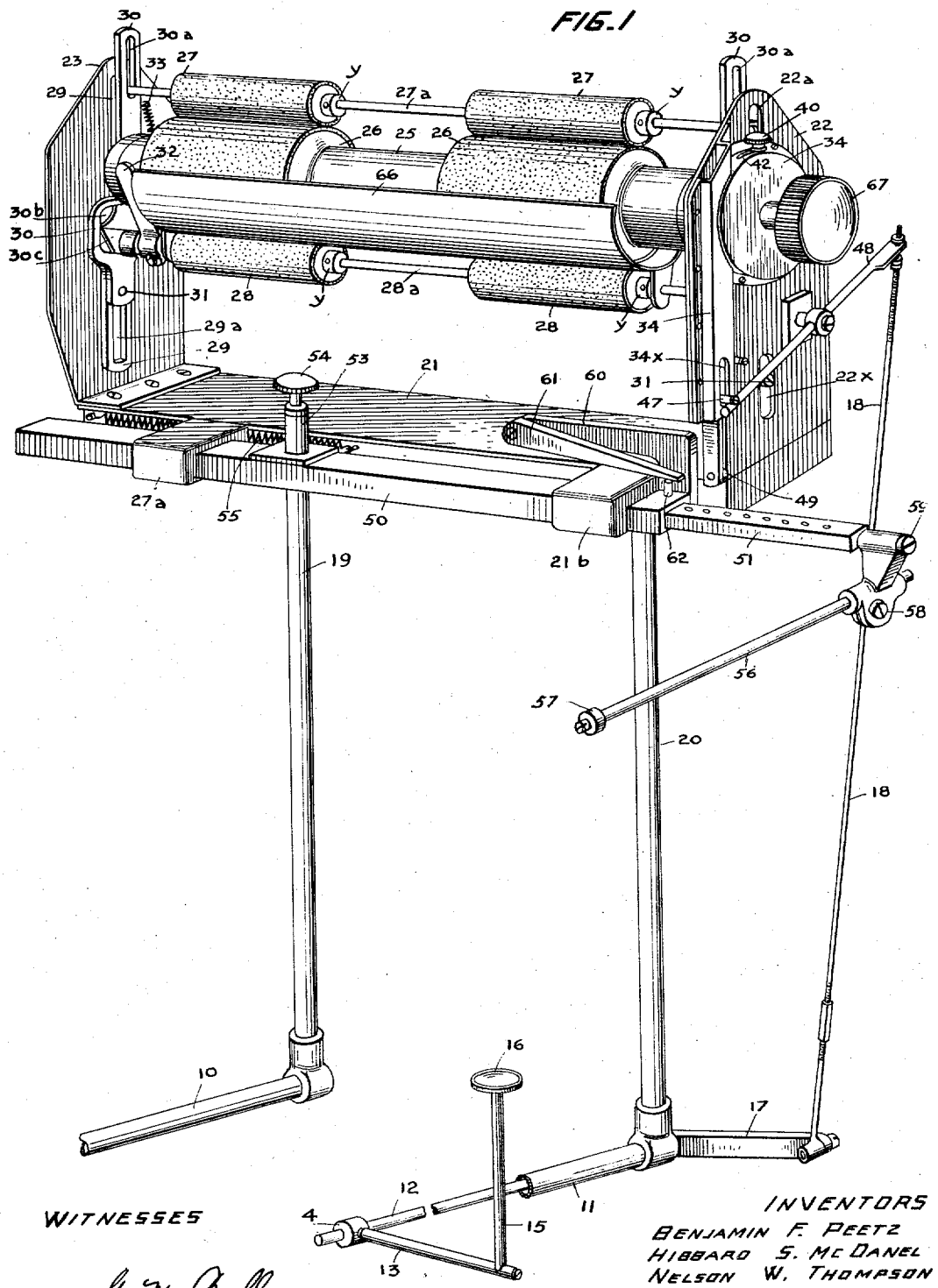

B. F. PEETZ, H. S. McDANEL & N. W. THOMPSON.

COPY HOLDER.

APPLICATION FILED JULY 25, 1913.

Reissued Dec. 23, 1913.

13,662.

3 SHEETS—SHEET 1.

WITNESSES

G. M. Ball

Leon Boillot

INVENTORS

BENJAMIN F. PEETZ

HIBBARD S. McDANEL

NELSON W. THOMPSON

By Francis M. Wright

ATTORNEY

B. F. PEETZ, H. S. McDANEL & N. W. THOMPSON.

COPY HOLDER.

APPLICATION FILED JULY 25, 1913.

Reissued Dec. 23, 1913.

13,662.

3 SHEETS—SHEET 2.

WITNESSES

G. M. Ball

Léon Boiller

INVENTORS

BENJAMIN F. PEETZ

HIBBARD S. McDANEL

NELSON W. THOMPSON

By Francis M. Wright

ATTORNEY

B. F. PEETZ, H. S. McDANEL & N. W. THOMPSON.
COPY HOLDER.
APPLICATION FILED JULY 25, 1913.
Reissued Dec. 23, 1913. 13,662.
3 SHEETS—SHEET 3.
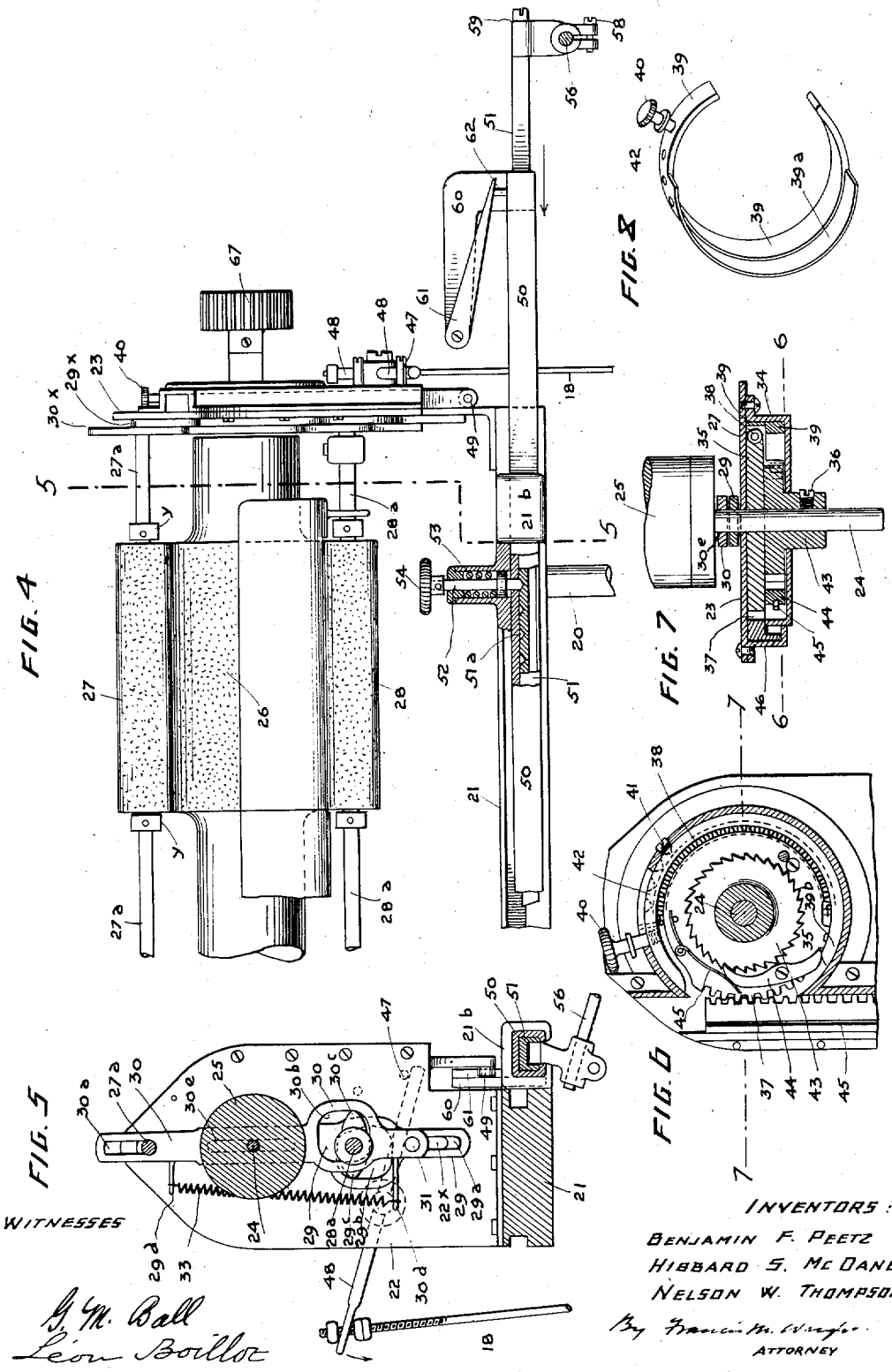
WITNESSES
G. M. Ball
Léon Boillot
INVENTORS:
BENJAMIN F. PEETZ
HIBBARD S. McDANEL
NELSON W. THOMPSON
By Francis M. Wright
ATTORNEY

UNITED STATES PATENT OFFICE.

BENJAMIN F. PEETZ, OF MORO, HIBBARD S. McDANEL, OF PORTLAND, AND NELSON W. THOMPSON, OF MORO, OREGON, ASSIGNORS, BY MESNE ASSIGNMENTS, TO GNU COPY HOLDER MANUFACTURING COMPANY, OF LOS ANGELES, CALIFORNIA, A CORPORATION OF CALIFORNIA.

COPY-HOLDER.

13,662. Specification of Reissued Letters Patent. Reissued Dec. 23, 1913.

Original No. 999,181, dated July 25, 1911, Serial No. 547,278. Application for reissue filed July 25, 1913. Serial No. 781,240½.

*To all whom it may concern:*

Be it known that we, BENJAMIN F. PEETZ, a resident of Moro, in the county of Sherman, HIBBARD S. McDANEL, a resident of Portland, in the county of Multnomah, and NELSON W. THOMPSON, a resident of Moro, in the county of Sherman, State of Oregon, citizens of the United States, have made certain new and useful Improvements in Copy-Holders, of which the following is a specification.

Our invention relates to copy holders for typewriters and it consists in the combinations, constructions and arrangements herein described and claimed.

An object of our invention is to provide a copy holder in which the copy may be fed forwardly by the mere act of operating the typewriter machine.

The invention relates more specifically to novel means for effecting the feed of the copy in which the feed mechanism may be operated by the movement of the typewriter itself, or manually if desired.

The mechanism for holding the copy, which is disclosed herein, will be made the subject of a divisional application.

Other objects and advantages will appear in the following specification and the novel features of the device will be particularly pointed out in the appended claims.

Our invention is illustrated in the accompanying drawings in which similar reference characters denote like parts in the several views, and in which—

Figure 3:
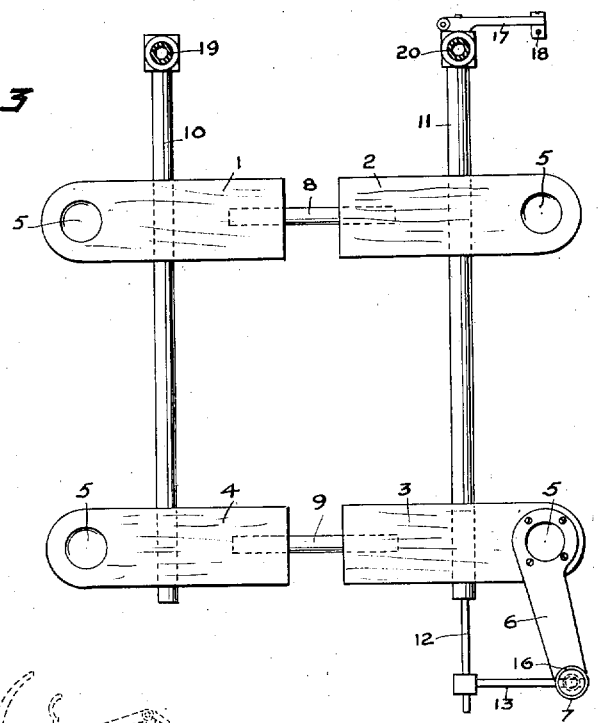
Figure 2:
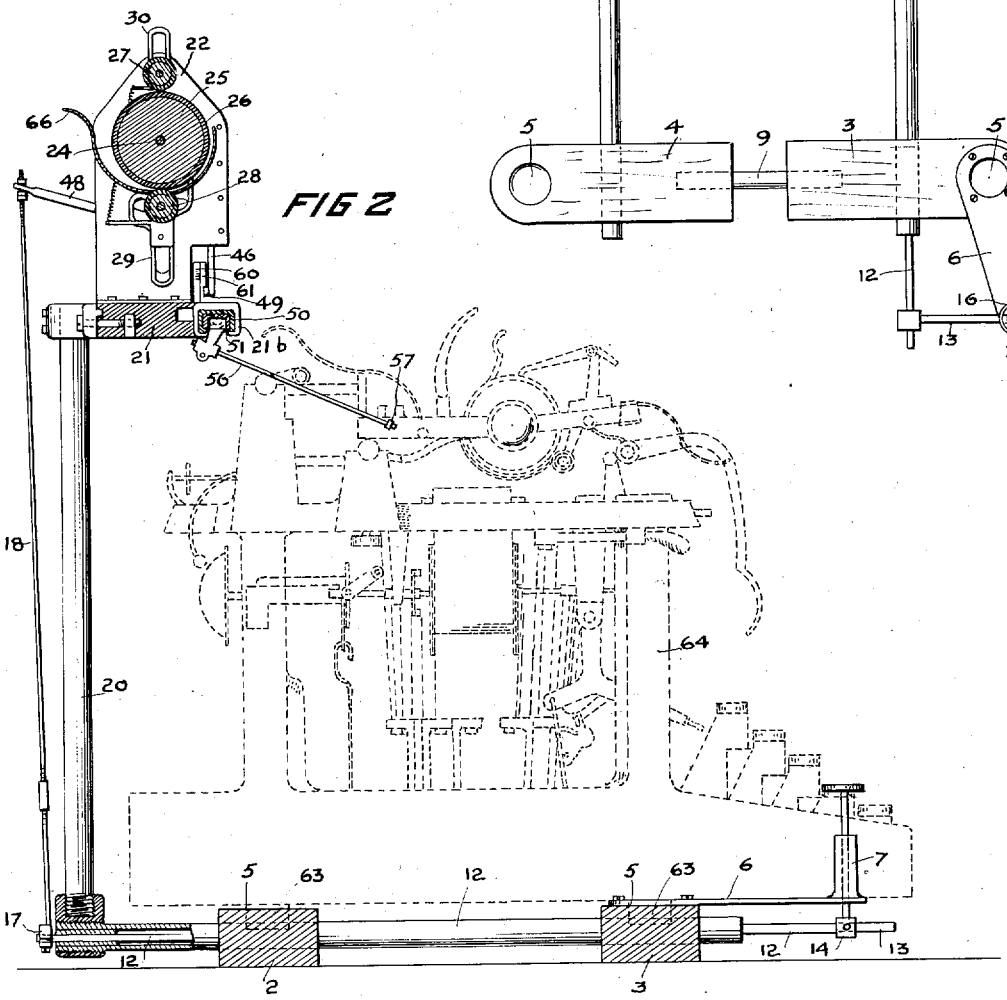

Figure 1 is a perspective view showing one embodiment of our invention. Fig. 2 is a vertical section through the device showing its application to a typewriting machine. Fig. 3 is a plan view showing the adjustable base. Fig. 4 is a front view of a portion of the device. Fig. 5 is a section along the line 5—5 of Fig. 4. Fig. 6 is a section along the line 6—6 of Fig. 7. Fig. 7 is a section along the line 7—7 of Fig. 6, and Fig. 8 is a perspective detail view of the adjustable shield.

In carrying out our invention we provide a base consisting of the members 1, 2, 3 and 4. Each of these members is provided with a recess 5 into which the feet of the typewriter are adapted to be placed. The member 3 is provided with a lateral supporting arm 6 which bears a cylindrical extension 7. The members 1 and 2 are adjustably connected by means of a pin 8 secured in one of the parts and adapted to slide back and forth in a recess in the other. The members 4 and 3 are similarly connected by the pin 9. The members 1 and 4 are loosely mounted on a rod 10 while the members 2 and 3 are mounted on a similar rod 11. The latter has a smaller rod 12 extending through its interior. On the rod 12 is a collar 14 which is adjustable longitudinally of the rod and which may be rotated around the rod and fastened in any position by means of the arm 13 which may be screwed up against the rod 12. The end of the arm 13 projects underneath the stem 15 of a key 16. On the opposite end of the rod 12 is a rock arm 17 which is pivotally connected to a link 18 which is adapted to operate the feeding mechanism in a manner hereinafter described. It will be seen that the base members may be adjusted to fit a typewriter of any size.

Screwed to the rear ends of the rods 10 and 11 are the uprights 19 and 20 respectively which bear at their upper ends the base 21 of the copy holder proper as shown in Fig. 2. The base 21 has secured at each end of it the side members 22 and 23 see Fig. 1. The member 22 is perforated to provide a bearing for the shaft 24 of the main copy holder roller 25, see Fig. 7. This roller is provided near each end with enlarged portions 26 having resilient coverings arranged to coöperate with the pressure rollers 27 above the main roller and rollers 28 below the main roller. The rollers 27 are loosely mounted on a shaft $27^a$, while the rollers 28 are loosely mounted on a similar shaft $28^a$, see Fig. 1. The members 22 and 23 each bear a pair of sliding plates on their inner sides and a description of one set of plates will suffice, since the plates on the other member are precisely the same. Considering then, the member 22 shown in Fig. 5, it will be seen that there is a plate 29 immediately next to the member 22 which is provided with a slot $29^a$ at its lower end.

Another plate 30 is inside of the plate 29 and adjacent to it and is provided with a slot $30^a$ at its upper end. From an inspection of Fig. 5, it will be seen that the plate 30 is provided with an opening $30^b$. A guide screw 31 is carried by the lower portion of the inner plate 30 and is adapted to extend through the slot $29^a$ in the plate 29 and also through a registering slot $22^x$ in the side member as shown in Fig. 5. The plate 29 bears the shaft $27^a$ on its upper end which is reduced so as to pass through the slot $30^a$ of the inner plate and which may also extend through a registering slot $22^a$ in the member 22. The shaft $28^a$ extends through the openings $29^b$ and $30^b$ of the plates 29 and 30 respectively. Secured to the end of the shaft $28^a$ are the cams $29^c$ and $30^c$. These cam members are disposed in the openings $29^b$ and $30^b$ of the respective plates 29 and 30.

In Fig. 1, we have shown a lever 32 for rocking the shaft $28^a$ and thereby causing the cam members $29^c$ and $30^c$ to move the plates 29 and 30 in opposite directions. A similar arrangement of cams is provided at the opposite ends of the shaft $28^a$, and hence the operation of the lever 32 will cause the pressure rollers operated by the shafts $28^a$ and $27^a$ to leave the main roller, as when the paper containing the copy is to be inserted or withdrawn, or for any other reason.

As will be seen from Figs. 1 and 5 a downward movement of the lever 32 will cause the cam $30^c$ to push the plate 30 downwardly, while the cam $29^c$ will push the plate 29 upwardly. The shaft $27^a$ will be carried upwardly with the plate 29. As soon, however as the shaft $27^a$ reaches the limit of the slot $22^a$, the movement of the plate 29 will be stopped, and the further revolution of the shaft $28^a$ will cause the cam $29^c$ to move the shaft $28^a$ downwardly. Thus, it will be seen that both of the shafts $28^a$ and $28^c$, together with their pressure rollers will be moved away from the main roller. A spring 33 which is connected to the arms $29^d$ and $30^d$ respectively tends to hold the pressure rollers close to the main roller. Each of the plates 29 and 30 is provided with a slot similar to the slot $30^e$ through which the shaft 24 of the roller 25 extends so as to allow a free movement of the plates.

On the outer side of the member 22 is secured a casing 34, see Fig. 1, which contains the main actuating mechanism of the copy roller. The construction of this mechanism is best shown in Figs. 6 and 7.

Referring now to Fig. 7, it will be seen that the shaft 24 of the roller 25 extends through the member 23 and loosely bears a member 35. The member 35 is provided with teeth 37 on one side and is grooved on the opposite side for the reception of a spiral spring 38, which is secured at one end to the member 35, see Fig. 6, and at the other end to a segmental shield 39 of the form shown in Fig. 8. The shield is provided with a flange $39^a$ which lies between the casing 34 and the periphery of the member 35, see Fig. 7, and the shield may be moved in this concentric runway by means of a thumb screw 40, but it may be locked in its adjusted positions by means of a set screw 41 which engages in the notches 42 in the periphery of the shield. A ratchet wheel 43 is secured to the shaft 24 by means of the set screw 36. A pawl 44 is pivotally mounted on the member 35 and is held in normal contact with the ratchet 42 by means of a spring 43, see Fig. 6.

Arranged to coöperate with the segmental gear 37 is a rack 46 which is provided with a lateral arm 47, see Fig. 1, arranged to pass through an opening $34^x$ in the casing 34 and adapted to be engaged by a lever 48 which is pivoted on the member 23 and whose end is connected with the link 18. The lower end of the rack member 46 is provided with a cam roller 49, see Figs. 1 and 4.

Referring now to Fig. 1, it will be seen that the base member 21 is provided with the extensions $21^a$ and $21^b$. These extensions slidably support a hollow bar 50 which has a telescopic member 51. The latter is provided with notches $51^a$, see Fig. 4, arranged to be engaged by the end of the spring controlled pin 52 which is carried by a cylindrical arm 53 secured to the bar 50. The pin bears a circular head 54 by which it may be manipulated. The rod 50 is acted on by a spiral spring 55 which is secured at one end of the base 21. The rod 51 bears on its end a laterally extending arm 56 provided with a resilient end member 57. The rod 56 may be adjusted in the direction of its length by means of the screw 58 or it may be rotated around the screw 59 as an axis by loosening the latter. The tightening of this screw holds the arm securely on its adjusted position. The rod 50 bears on one end an L-shaped support 60 to which is pivoted the cam 61. The free end of the latter rests loosely on an adjustable pin 62 carried by the bar 50.

From the foregoing description of the various parts of the device the operation thereof may be readily understood.

In using this device the base members 1, 2, 3 and 4 are adjusted to fit the feet 63 of a typewriter 64 as shown in Fig. 2. The key 16 will then be adjacent the keys 65 of the typewriter. The rod 56 is then adjusted so as to be adjacent some portion of the typewriter carriage when the latter is near the end of its return movement. This may be accomplished by manipulating the spring actuated pin 52 and adjusting the rod 51 and also by adjusting the rod 56 upon the rod 51 in the manner already described. The paper containing the copy may be inserted between the paper guide 66 and the main roller 25. The roller may be turned by means of the thumb wheel 67 so as to feed the paper in. Now by pressing downwardly on the lever 32 the pressure rollers are separated from the main roller and the paper may be passed between them. The thumb wheel 67 may then be turned until the paper is brought to the proper place. It will be noted that as the thumb wheel is turned the ratchet wheel 43 is turned idly, the pawl 44 riding over the teeth of the ratchet. The paper is now in position for copying and the return movement of the typewriter carriage carries the rod 50 along with it. The inclined cam 61 engages the roller 49 and the rack is lifted thereby as the typewriter carriage continues to move. The upward movement of the rack causes the revolution of the roller 25 through the medium of the pawl 44 and the rack 43. The roller 49 rides over the pivoted end of the cam 61 and the rack descends, the end of the pawl riding over the teeth of the ratchet as the member 35 is rotated. The roller 49 moves downwardly behind the pivot of the cam 61, and in the next forward movement of the carriage this roller slides beneath the cam 61, and by raising the cam it is enabled to pass between the cam and the pin 62.

In the position in Fig. 6 the shield is adjusted so as to permit a maximum line spacing. If a shorter distance is desired the screw 41 is loosened and by means of the screw 40 the shield is shifted to the next notch 42. The lower end 39[b] of the shield, see Fig. 6, now holds the pawl 44 free from the ratchet until the pawl is moved far enough to clear the end of the shield. It will be obvious that not as great a movement of the ratchet will occur as when the pawl is always in engagement with the ratchet teeth. Various adjustments of line spacing may be had by setting the screw 41 in different notches.

In case the operator should wish to shift the copy a definite number of lines without moving the typewriter he may do so by depressing the key 16. The depression of this key will cause an upward movement of the lever 48 and hence of the rack and will result in turning the copy roller a definite amount. Thus one depression of the key may turn it two spaces and another four spaces so that by working the key the copy may be brought to the line desired.

We claim:—

1. In a copy holder, an adjustable typewriter base, uprights secured thereto, an auxiliary base secured to said uprights, side members secured to said auxiliary base, a cam slidably supported on said auxiliary base, an arm arranged to be engaged by the movement of the typewriter to move said slidable cam and mechanism adapted to be actuated by said cam for turning the main roller.

2. In a copy holder, an adjustable typewriter base, uprights secured thereto, an auxiliary base secured to said uprights, side members secured to said auxiliary base, a cam slidably supported on said auxiliary base, an arm arranged to be engaged by the movement of the typewriter to move said slidable cam, a rack arranged to be engaged by said cam, a pinion loosely mounted on the shaft of the main roller, and means actuated by the movement of said pinion for turning the main roller.

3. In a copy holder, an adjustable typewriter base, uprights secured thereto, a copy holder roller mounted on said uprights, a segmental pinion loosely mounted on the shaft of said copy holder roller, means for communicating the movement of said segmental pinion in one direction to said shaft, a rack arranged to engage said pinion, a slidable cam for actuating said rack, and means for communicating the return movement of the carriage of the typewriter to said slidable cam and a lever and link for operating the rack independently of the typewriter.

4. In a copy holder, an adjustable typewriter base, uprights carried thereby, a copy holder base mounted on said uprights, a slidable rod carried by said copy holder base and having a telescopic extension, an arm carried by said extension and adapted to be engaged by the return movement of the typewriter carriage, a cam carried by said slidable arm, a rack adapted to be engaged by said cam, a pinion, a main roller, a ratchet mounted on the shaft of the main roller and adapted to be actuated by said pinion, a rock shaft carried by said adjustable base, a lever arranged to engage said rack and a link connecting said lever with said rock shaft.

5. In a copy holder, a feed mechanism comprising a main roller, a ratchet secured to the shaft of the main roller, a segmental pinion loosely mounted on said shaft and provided with a pawl arranged to engage said ratchet, a rack arranged to engage the teeth of said pinion, a shield for regulating the engagement of the pawl with the teeth of said ratchet and means actuated by the return movement of the carriage of a typewriter for moving the rack.

6. In a copy holder for typewriters, means for securing it in proper position relative to the typewriter, a frame, a copy-holding roller rotatably supported in said frame, means for rotating said roller through a predetermined angular distance, an operative train of mechanism, of which one end engages said rotating means to actuate the same, and the other end extends adjacent to the typewriter keys, a key on said other end, a forwardly extending movable arm arranged to be actuated by a part moving with the typewriter carriage, and means operated by the movement of said arm for actuating said rotating means.

7. In a copy holder for typewriters, means for securing it in proper position relative to the typewriter, a frame, a copy-holding roller rotatably supported in said frame, means for rotating said roller through a predetermined angular distance, a lever operatively connected to said means to actuate the same, its front end extending adjacent to the typewriter keys, a key on said front end, a forwardly extending movable arm arranged to be actuated by a part moving with the typewriter carriage, and means operated by the movement of said arm for actuating said rotating means.

8. In a copy holder for typewriters, means for securing it in proper position relative to the typewriter, a frame, a copy-holding roller rotatably supported in said frame, means for rotating said roller through a predetermined angular distance, a lever operatively connected to said means to actuate the same, its front end extending adjacent to the typewriter keys, a key on said front end, a slide bar, a forwardly extending arm carried by said slide bar in position to be actuated by a part moving with the typewriter carriage, and means operated by the movement of said slide bar for actuating said rotating means.

9. In a copy holder for typewriters, means for securing it in proper position relative to the typewriter, a frame, a copy-holding roller rotatably supported in said frame, means for rotating said roller through a predetermined angular distance, a lever operatively connected to said means to actuate the same, its front end extending adjacent to the typewriter keys, a key on said front end, a slide bar, a forwardly extending arm carried by said slide bar in position to be actuated by a part moving with the typewriter carriage, a device carried by said slide-bar and arranged to operatively engage said rotating means on the movement in one direction only thereof.

BENJAMIN F. PEETZ.
HIBBARD S. McDANEL.
NELSON W. THOMPSON.

Witnesses to the signatures of Benjamin F. Peetz and Nelson W. Thompson:

L. BARNUM,
R. J. GINN.

Witnesses to the signature of Hibbard S. McDanel:

R. J. GINN,
C. G. HULSE.